United States Patent
Koyama et al.

(10) Patent No.: US 10,071,682 B2
(45) Date of Patent: Sep. 11, 2018

(54) ILLUMINATION DEVICE

(71) Applicant: NIFCO INC., Yokosuka-shi, Kanagawa (JP)

(72) Inventors: Sachiko Koyama, Yokosuka (JP); Taeko Ueno, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 9 days.

(21) Appl. No.: 15/318,843

(22) PCT Filed: Jun. 23, 2015

(86) PCT No.: PCT/JP2015/068054
§ 371 (c)(1),
(2) Date: Dec. 14, 2016

(87) PCT Pub. No.: WO2015/199076
PCT Pub. Date: Dec. 30, 2015

(65) Prior Publication Data
US 2017/0120809 A1    May 4, 2017

(30) Foreign Application Priority Data

Jun. 24, 2014 (JP) ................. 2014-129548

(51) Int. Cl.
*B60Q 3/20* (2017.01)
*B60N 3/10* (2006.01)
(Continued)

(52) U.S. Cl.
CPC ............. *B60Q 3/20* (2017.02); *B60N 3/10* (2013.01); *B60Q 3/62* (2017.02); *B60Q 3/64* (2017.02); *F21Y 2115/10* (2016.08)

(58) Field of Classification Search
CPC ........ B60Q 3/0243; B60Q 3/002; B60Q 3/20; B60Q 3/64; F21Y 2115/10; G02B 6/0018;
(Continued)

(56) References Cited

U.S. PATENT DOCUMENTS 6,164,805 A   12/2000  Hulse
6,234,439 B1  5/2001   Townsend et al.
(Continued)

FOREIGN PATENT DOCUMENTS

CN    103507688 A    1/2014
DE    102009017296 A1   10/2010
(Continued)

OTHER PUBLICATIONS

Japan Patent Office, "Office Action for Japanese Patent Application No. 2014-129548," dated Jun. 23, 2017.

*Primary Examiner* — Anh Mai
*Assistant Examiner* — Fatima Farokhrooz
(74) *Attorney, Agent, or Firm* — Manabu Kanesaka

(57) ABSTRACT

An illumination device includes a housing portion having an opening for inserting an object to be housed, and a bottom face capable of supporting the object to be housed; a light source; and a light-guide plate having a light-emitting face and guiding a light of the light source to emit light from the light-emitting face. The light-guide plate is disposed between the opening of the housing portion and the bottom face, and at least one portion of the light-emitting face of the light-guide plate is arranged to form an acute angle with respect to the bottom face so as to directly irradiate the bottom face from a diagonal direction.

7 Claims, 3 Drawing Sheets

(51) Int. Cl.
*B60Q 3/62* (2017.01)
*B60Q 3/64* (2017.01)
*F21Y 115/10* (2016.01)

(58) Field of Classification Search
CPC .... G02B 6/002; G02B 6/0028; G02B 6/0068; B60N 3/108
See application file for complete search history.

(56) References Cited

U.S. PATENT DOCUMENTS

| | | | |
|---|---|---|---|
| 2009/0201698 A1* | 8/2009 | Klick | G02B 6/0018 362/555 |
| 2011/0261579 A1 | 10/2011 | Anderson et al. | |
| 2013/0258670 A1 | 10/2013 | Abro et al. | |
| 2013/0294105 A1 | 11/2013 | Reuschel | |
| 2015/0175065 A1* | 6/2015 | Oh | B60N 3/106 362/154 |
| 2015/0197191 A1* | 7/2015 | Salter | B60Q 3/64 362/510 |
| 2016/0023594 A1* | 1/2016 | Salter | H05B 37/0227 315/153 |
| 2016/0259109 A1* | 9/2016 | Wolfing | G02B 6/0028 |

FOREIGN PATENT DOCUMENTS

| | | |
|---|---|---|
| DE | 102012017597 A1 | 3/2014 |
| JP | 2005-329753 A | 12/2005 |
| JP | 2006-069356 A | 3/2006 |
| JP | 2007-203800 A | 8/2007 |
| JP | 4648913 B2 | 3/2011 |
| JP | 2013-518770 A | 5/2013 |
| JP | 2014-100980 A | 6/2014 |

\* cited by examiner

ILLUMINATION DEVICE

RELATED APPLICATIONS

The present application is National Phase of International Application No. PCT/JP2015/068054 filed Jun. 23, 2015, and claims priority from Japanese Application No. 2014-129548, filed Jun. 24, 2014, the disclosure of which is hereby incorporated by reference herein in its entirety.

FIELD OF TECHNOLOGY

The present invention relates to an illumination device comprising a housing portion including an opening for inserting an object to be housed, and a bottom face capable of supporting the object to be housed; a light source; and a light-guide plate including a light-emitting face and guiding a light of the light source to emit light from the light-emitting face.

BACKGROUND ART

An illumination device described in Japanese Unexamined Patent Application Publication No. 2005-329753 comprises a cup holder including an opening for inserting an object to be housed, and a bottom face capable of supporting the object to be housed; and a light source disposed along a circumference of the opening and formed by a strip-shaped electro luminescence material. The light source formed by the electro luminescence material is different from a general point light source, and the entirety of the light-emitting face emits light uniformly, so that the entirety of an opening area of the cup holder can be irradiated evenly.

An illumination device shown in FIG. 1 to FIG. 5 of Japanese Patent No. 4648913 comprises a cup holder including an opening for inserting an object to be housed, and a bottom face capable of supporting the object to be housed; and a light source including a light-emitting face formed by an annular or doughnut-shaped EL film. Such illumination device can irradiate the entirety of the opening area of the cup holder evenly as well.

The aforementioned illumination devices are a device with a type irradiating a light from a lateral side of the object to be housed in the opening area of the cup holder. On the other hand, the illumination device shown in FIG. 6 to FIG. 8 of the Japanese Patent No. 4648913 is a device with a type illuminating the opening area of the cup holder from below using a reflection at a conical inclined face.

SUMMARY OF THE INVENTION

The present inventors performed various examinations with respect to an illumination method for advancing a development and design of a cup holder with an indirect illumination. In that process, with respect to a type illuminating an opening area of the cup holder from below, the present inventors found that an illumination method using a reflection light from a bottom face of the cup holder provides a peculiar aesthetic appearance as the indirect illumination.

The present invention is made based on the aforementioned knowledge. An object of the present invention is to provide an illumination device comprising a housing portion including an opening for inserting an object to be housed, and a bottom face capable of supporting the object to be housed; a light source; and a light-guide plate including a light-emitting face and guiding a light of the light source to emit light from the light-emitting face, wherein a reflection light from the bottom face of the housing portion can be used.

The present invention is an illumination device comprising a housing portion including an opening for inserting an object to be housed, and a bottom face capable of supporting the object to be housed; a light source; and a light-guide plate including a light-emitting face and guiding the light of the light source to emit the light from the light-emitting face. The light-guide plate is disposed between the opening of the housing portion and the bottom face, and at least one portion of the light-emitting face of the light-guide plate is arranged to form an acute angle with respect to the bottom face so as to directly irradiate the bottom face from a diagonal direction.

According to the present invention, at least one portion of the light-emitting face of the light-guide plate is arranged to form the acute angle with respect to the bottom face to directly irradiate the bottom face from the diagonal direction so as to provide the peculiar aesthetic appearance as the indirect illumination using the reflection light from the bottom face.

Preferably, at least one portion of the light-emitting face forms 5 to 85 degrees with respect to the bottom face. More preferably, at least one portion of the light-emitting face forms 20 to 40 degrees with respect to the bottom face.

Also, preferably, the housing portion includes an inclined face tapered toward the bottom face on the bottom face side relative to the light-guide plate. In that case, further preferably, the light-emitting face simultaneously irradiates the inclined face and the bottom face. In that case, in addition to the reflection light from the bottom face, a reflection light from the inclined face can be used as well so as to provide the peculiar aesthetic appearance as the indirect illumination furthermore.

In that case, it is further preferable that the light-emitting face simultaneously irradiates the inclined face and a center portion of the bottom face. In the present specification, the center portion of the bottom face is an area having a shape similar to the bottom face with a ratio of 1/2 or less with respect to the bottom face. According to the present inventors, it is confirmed that at a time of such irradiation condition, the most beautiful aesthetic appearance as the indirect illumination can be provided.

Also, it is preferable that the housing portion includes a wall portion covering the light-guide plate on the opening side relative to the light-guide plate. In that case, the wall portion can prevent the light-guide plate from being directly visually recognized so as to emphasize the aesthetic appearance as the indirect illumination furthermore.

Also, it is preferable that the light-guide plate includes a back face facing parallel to the light-emitting face. In that case, a light directivity irradiated from the light-emitting face can be enhanced, and an intensity (amount) of illumination can be easily controlled.

Also, a surface state of the back face may be actively changed to control the intensity (amount) of illumination. When the surface state of the back face is changed, an irradiation range can be controlled as well. As for a specific aspect for changing the surface state of the back face, there are given examples such as providing convex and concave shapes, applying emboss processing, and the like.

BEST MODES OF CARRYING OUT THE INVENTION

Hereinafter, with reference to attached drawings, an embodiment of the present invention will be explained in detail.

Figure 1:
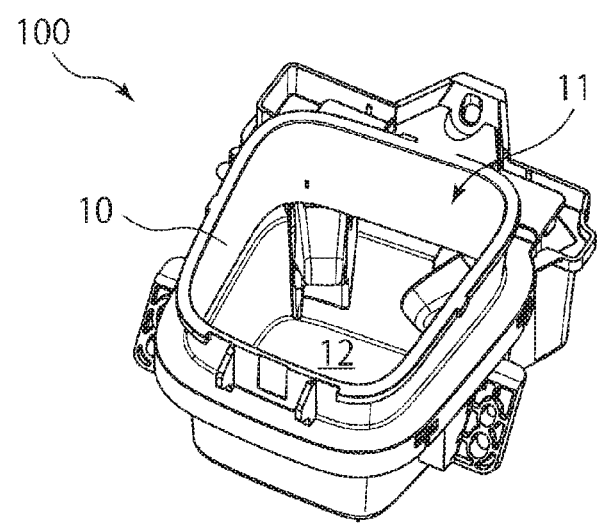
FIG. 1 is a schematic perspective view of an illumination device of one embodiment of the present invention.
Figure 2:
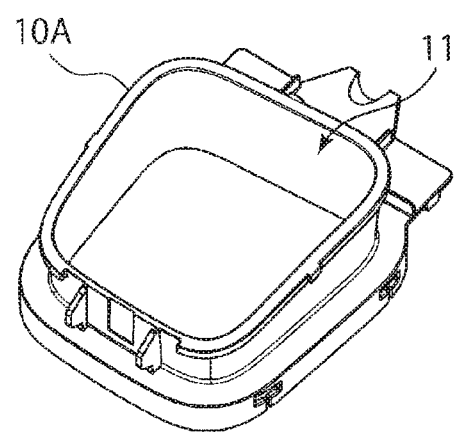
FIG. 2 is a schematic perspective view showing an opening-side housing portion of the illumination device in FIG. 1.
Figure 3:
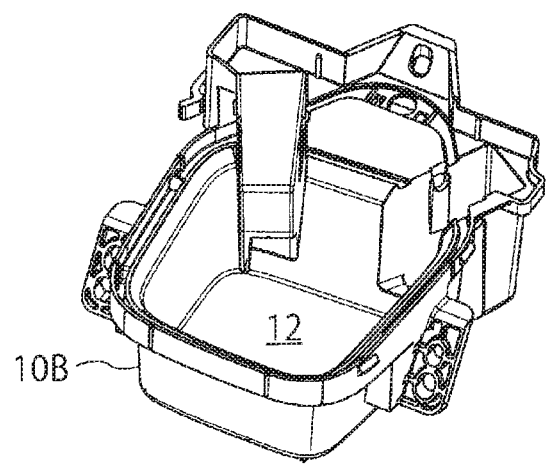
FIG. 3 is a schematic perspective view showing a bottom-face-side housing portion of the illumination device in FIG. 1.
Figure 4:
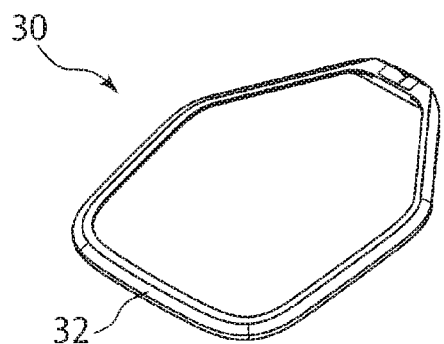
FIG. 4 is a schematic perspective view showing a light-guide plate of the illumination device in FIG. 1.
Figure 5:
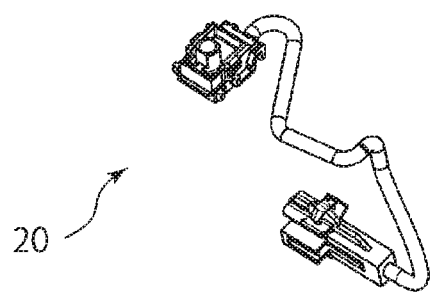
FIG. 5 is a schematic perspective view showing a light source of the illumination device in FIG. 1.

FIG. 1 is a schematic perspective view of an illumination device 100 of one embodiment of the present invention. The illumination device 100 shown in FIG. 1 comprises a housing portion 10 which is a cup holder including an opening 11 for inserting an object to be housed, such as a plastic bottle and the like, and a bottom face 12 capable of supporting the object to be housed. As shown in FIG. 2 and FIG. 3, the housing portion 10 includes an opening-side (upper-side) housing portion 10A and a bottom-face-side (lower-side) housing portion 10B. Then, there is disposed a light-guide plate 30 made of light-transmitting resin shown in FIG. 4 in such a way as to be sandwiched between the opening-side housing portion 10A and the bottom-face-side housing portion 10B, and the light-guide plate 30 guides a light of a light source shown in FIG. 5 so as to irradiate the light from an annular and diagonally downwardly directed light-emitting face 31. As shown in FIG. 5, the light source of the present embodiment is an LED unit 20.

Figure 6:
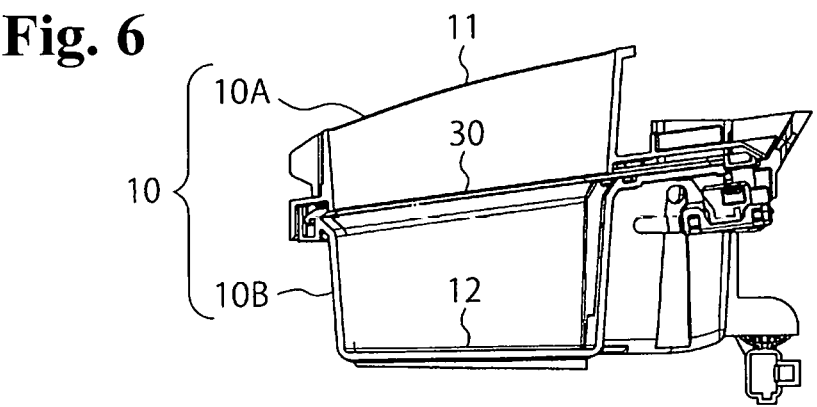
FIG. 6 is a schematic cross-sectional view of the illumination device in FIG. 1.
Figure 7:
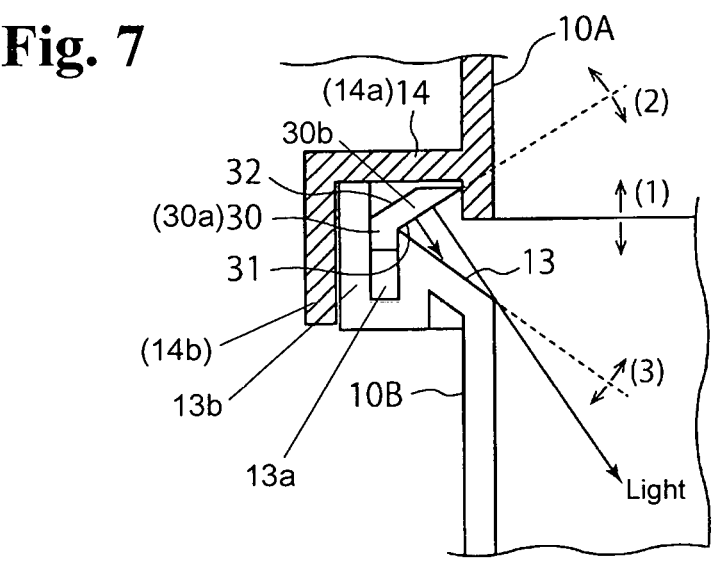
FIG. 7 is an enlarged view of essential parts in FIG. 6.

FIG. 6 is a schematic cross-sectional view of the illumination device in FIG. 1, and FIG. 7 is an enlarged view of essential parts in FIG. 6. As shown in FIG. 6 and FIG. 7, the light-guide plate 30 is disposed between the opening 11 of the opening-side housing portion 10A and the bottom face 12 of the bottom-face-side housing portion 10B, and has a first piece 30a fit into a groove 13a between an outer wall member 13b and the inclined wall 13 and a second piece 30b having the annular light-emitting face 31 of the light-guide plate 30 forming an angle of 5 to 85 degrees, preferably an angle of 20 to 40 degrees with respect to the bottom face 12 so as to directly irradiate the bottom face 12 from a diagonal direction.

Also, as shown in FIG. 6 and FIG. 7, the bottom-face-side housing portion 10B includes an inclined face 13 tapered toward the bottom face 12 on a bottom face 12 side relative to the light-guide plate 30. Then, in the present embodiment, the light-emitting face 31 of the light-guide plate 30 simultaneously irradiates the inclined face 13 and a center portion of the bottom face 12. The center portion of the bottom face 12 is an area having a shape similar to the bottom face 3 with a ratio of 1/2 or less with respect to the bottom face 12.

Also, as shown in FIG. 6 and FIG. 7, the opening-side housing portion 10A includes a wall portion 14 covering the light-guide plate 30 on an opening 11 side relative to the light-guide plate 30. In an example in FIG. 7, an area shown with oblique lines represents the wall portion 14.

Also, as shown in FIG. 6 and FIG. 7, the light-guide plate 30 includes a back face 32 facing parallel to the light-emitting face 31.

Next, an operation of the present embodiment as mentioned above will be explained.

In the present embodiment, the light-emitting face 31 of the light-guide plate 30 forms the angle of 20 to 40 degrees with respect to the bottom face 12 so as to directly irradiate the bottom face 12 from the diagonal direction. Consequently, a reflection light from the bottom face 12 can be used so as to provide a peculiar aesthetic appearance as an indirect illumination.

Also, in the present embodiment, the bottom-face-side housing portion 10B includes the inclined face 13 tapered toward the bottom face 12 on the bottom face 12 side relative to the light-guide plate 30, and the light-emitting face 31 of the light-guide plate 30 simultaneously irradiates the inclined face 13 and the bottom face 12. Consequently, in addition to the reflection light from the bottom face 12, a reflection light from the inclined face 13 can be used as well so as to provide the peculiar aesthetic appearance as the indirect illumination furthermore. Especially, in the present embodiment, the center portion of the bottom face 12 is irradiated so as to provide the most beautiful aesthetic appearance as the indirect illumination.

Also, in the present embodiment, a wall member 14 of the opening-side housing portion 10A includes a first portion 14a and a second portion 14b to prevent the light-guide plate 30 from being directly visually recognized from the opening 11 side so as to excel in a design property as the indirect illumination, and completely solve a problem that a direct light from the light-guide plate 30 projects onto a window glass of an automobile and the like as well.

Also, in the present embodiment, the light-guide plate includes the back face 32 facing parallel to the light-emitting face 31 so as to enhance a light directivity irradiated from the light-emitting face 31, and easily control an intensity (amount) of illumination.

As mentioned above, according to the present embodiment, the light-emitting face 31 of the light-guide plate 30 forms an acute angle with respect to the bottom face 12 so as to directly irradiate the bottom face 12 from the diagonal direction, so that the reflection light from the bottom face 12 can be used to provide the peculiar aesthetic appearance as the indirect illumination.

Also, according to the present embodiment, the bottom-face-side housing portion 10B includes the inclined face 13 tapered toward the bottom face 12 on the bottom face 12 side relative to the light-guide plate 30, and the light-emitting face 30 simultaneously radiates the inclined face 13 and the bottom face 12, so that the reflection light from the inclined face 13 can be used as well in addition to the reflection light from the bottom face 12 so as to provide the peculiar aesthetic appearance as the indirect illumination furthermore.

Also, according to the present embodiment, the light-emitting face 30 simultaneously irradiates the inclined face 13 and the center portion of the bottom face 12 so as to provide the most beautiful aesthetic appearance as the indirect illumination.

Also, according to the present embodiment, the opening-side housing portion 10A includes the wall portion 14 covering the light-guide plate 30 on the opening 11 side relative to the light-guide plate 30 so as to prevent the light-guide plate 30 from being directly visually recognized. Thereby, the aesthetic appearance as the indirect illumination can be emphasized furthermore.

Also, according to the present embodiment, the light-guide plate 30 includes the back face 32 facing parallel to the light-emitting face 31 so as to enhance the light directivity irradiated from the light-emitting face 31, and easily control the intensity (amount) of illumination as well.

Incidentally, as shown in FIG. 7, in the illumination device 100 of the present embodiment, an illumination method can be finely adjusted by changing a design as follows.

(1) A height of a lower end edge of the wall member 14 is changed.

(2) The angle of the light-emitting face 31 of the light-guide plate 30 is changed.

(3) An angle of the inclined face 13 is changed.

Regarding all of the aforementioned changed items (1) to (3), the entirety of an annular area may be uniformly changed, or may be locally changed (so as to become uneven). Due to the aforementioned changes, a condition of an irradiation to the bottom face 12, eventually a condition of a reflection at the bottom face 12 can be adjusted. Similarly, a condition of an irradiation to the inclined face 13, eventually a condition of a reflection at the inclined face 13 can be adjusted.

Also, the illumination method can be finely adjusted even by changing an amount of light of the light source 20.

EXPLANATION OF SYMBOLS 10 a housing portion
10A an opening-side housing portion
10B a bottom-face-side housing portion
11 an opening
12 a bottom face
13 an inclined face
14 a wall member
20 a light source (an LED unit)
30 a light-guide plate
31 a light-emitting face
32 a back face
100 an illumination device

What is claimed is:

1. An illumination device, comprising:
   a housing portion having
      an opening-side housing portion including an opening for inserting an object to be housed and a wall member protruding outwardly from a lower portion of the opening-side housing portion, and
      a bottom-face-side housing portion arranged below the opening-side housing portion and including
         a bottom face adapted to support the object to be housed,
         an inclined face arranged at an upper portion of the bottom-faced-side housing portion and tapered toward the bottom face,
         an outer wall member arranged outside the inclined face, and
         a groove arranged between the outer wall member and the inclined face;
   a light source disposed at the housing portion; and
   a light-guide plate disposed in the groove of the bottom-face-side housing portion and above the inclined face, for guiding a light of the light source, the light-guide plate including a light-emitting face forming an acute angle in respect to the bottom face to emit the light to directly irradiate the bottom face,
   wherein the wall member covers the light-guide plate from above and surrounds the outer wall member.

2. An illumination device according to claim 1, wherein at least one portion of the light-emitting face is arranged to form 5 to 85 degrees with respect to the bottom face.

3. An illumination device according to claim 1, wherein the light-emitting face simultaneously irradiates the inclined face and the bottom face.

4. An illumination device according to claim 1, wherein the light-guide plate includes a back face facing parallel to the light-emitting face.

5. An illumination device according to claim 1, wherein the light-guide plate includes
   a first piece to fit into the groove of the bottom-face-side housing portion, and
   a second piece extending from the first piece and including
      the light-emitting face, and
      a back face facing parallel to the light-emitting face, for directing the light, and
   the second piece is inclined upwardly and toward a center of the housing portion so that the light-emitting face faces the inclined face and the bottom face to simultaneously irradiate the inclined face and the bottom face.

6. An illumination device according to claim 3, wherein the light-emitting face simultaneously irradiates the inclined face and a center portion of the bottom face.

7. An illumination device according to claim 5, wherein the wall member includes
   a first portion extending outwardly away from the center of the housing portion and above the light-guide plate, and
   a second portion extending downwardly from the first portion to surround the outer wall member.

* * * * *